(12) United States Patent
Yuret

(10) Patent No.: US 6,957,213 B1
(45) Date of Patent: Oct. 18, 2005

(54) METHOD OF UTILIZING IMPLICIT REFERENCES TO ANSWER A QUERY

(75) Inventor: Deniz Yuret, Redondo Beach, CA (US)

(73) Assignee: InQuira, Inc., San Bruno, CA (US)

( * ) Notice: Subject to any disclaimer, the term of this patent is extended or adjusted under 35 U.S.C. 154(b) by 0 days.

(21) Appl. No.: 09/572,770

(22) Filed: May 17, 2000

(51) Int. Cl.[7] .............................................. G06F 17/30
(52) U.S. Cl. .................................. 707/4; 707/2; 704/9
(58) Field of Search ........................... 707/1–4; 704/1, 704/9, 10

(56) References Cited

U.S. PATENT DOCUMENTS

| | | | |
|---|---|---|---|
| 5,321,833 A | 6/1994 | Chang et al. ................... 707/5 |
| 5,535,382 A | 7/1996 | Ogawa ........................... 707/5 |
| 5,694,546 A | 12/1997 | Reisman ....................... 705/26 |
| 5,742,816 A | 4/1998 | Barr et al. ..................... 707/3 |
| 5,794,050 A | 8/1998 | Dahlgren et al. ........... 717/144 |
| 5,812,865 A | 9/1998 | Theimer et al. ............ 709/228 |
| 5,826,269 A | 10/1998 | Hussey ........................ 707/10 |
| 5,848,399 A | 12/1998 | Burke ......................... 705/27 |
| 5,873,076 A | 2/1999 | Barr et al. ..................... 707/3 |
| 5,873,080 A | 2/1999 | Coden et al. .................. 707/3 |
| 5,884,302 A | 3/1999 | Ho ................................ 707/3 |
| 5,893,091 A | 4/1999 | Hunt et al. .................... 707/3 |
| 5,897,622 A | 4/1999 | Blinn et al. .................. 705/26 |
| 5,901,287 A | 5/1999 | Bull et al. ................... 709/218 |
| 5,913,215 A | 6/1999 | Rubinstein et al. .......... 707/10 |
| 5,948,054 A * | 9/1999 | Nielsen ....................... 709/200 |
| 5,966,695 A | 10/1999 | Melchione et al. ........... 705/10 |
| 5,974,412 A | 10/1999 | Hazlehurst et al. ............ 707/3 |
| 5,987,454 A | 11/1999 | Hobbs ........................... 707/4 |
| 5,995,921 A | 11/1999 | Richards et al. .............. 704/9 |
| 6,006,225 A | 12/1999 | Bowman et al. ............. 705/26 |
| 6,016,476 A | 1/2000 | Maes et al. .................... 705/1 |
| 6,021,403 A | 2/2000 | Horvitz et al. ................ 706/45 |
| 6,028,601 A * | 2/2000 | Machiraju et al. .......... 345/705 |
| 6,052,710 A | 4/2000 | Saliba et al. ................ 709/203 |
| 6,061,057 A | 5/2000 | Knowlton et al. .......... 345/744 |
| 6,078,914 A * | 6/2000 | Redfern ......................... 707/3 |
| 6,233,547 B1 * | 5/2001 | Denber ......................... 704/9 |
| 6,370,535 B1 * | 4/2002 | Shapiro et al. ............. 707/100 |
| 6,466,899 B1 * | 10/2002 | Yano et al. .................... 704/1 |
| 6,471,521 B1 * | 10/2002 | Dornbush et al. .......... 434/322 |
| 6,584,464 B1 * | 6/2003 | Warthen ........................ 707/4 |

FOREIGN PATENT DOCUMENTS

WO    PCT/US01/15711    5/2001

OTHER PUBLICATIONS

Don Clark, "AnswerFriend Seeks To Sell Question–Answering Software," Wall Street Journal, Aug. 24, 2000.

Deniz Yuret, "Discovery of Linguistic Relations Using Lexical Attraction" PhD Thesis, MIT, May 15, 1998.

Deniz Yuret, "Lexical Attraction Models of Language." Submitted to The Sixteenth National Conference on Artificial Intelligence, 1999.

Boris Katz, Deniz Yuret, et al. "Integrating Large Lexicons and Web Resources into a Natural Language Query System." To appear in Proceedings of the IEEE International Conference on Multimedia Computing and Systems, 1999.

* cited by examiner

Primary Examiner—Greta Robinson
Assistant Examiner—Cheryl Lewis
(74) Attorney, Agent, or Firm—Cooley Godward LLP

(57) ABSTRACT

A method of utilizing implicit references to answer a query includes receiving segments of text, wherein individual segments have elements. Implicit references are inferred between elements of the segments. The inferring operation includes identifying implicit references to antecedent elements. A query is received. In response to the query, one or more segments are identified as relevant to the query based at least in part on the implicit references.

28 Claims, 5 Drawing Sheets

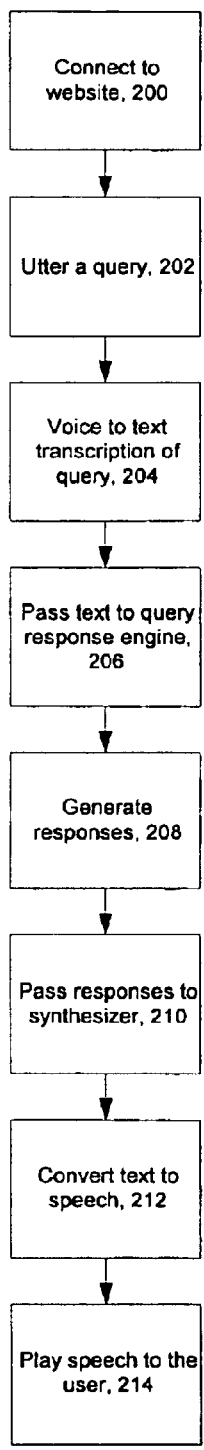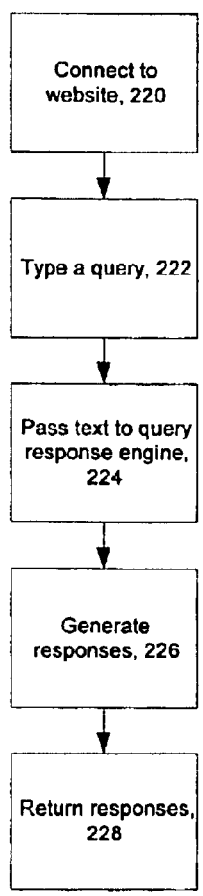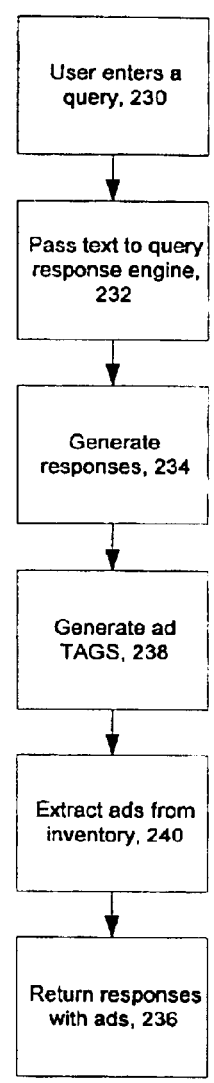
Figure 5
Figure 6
Figure 4

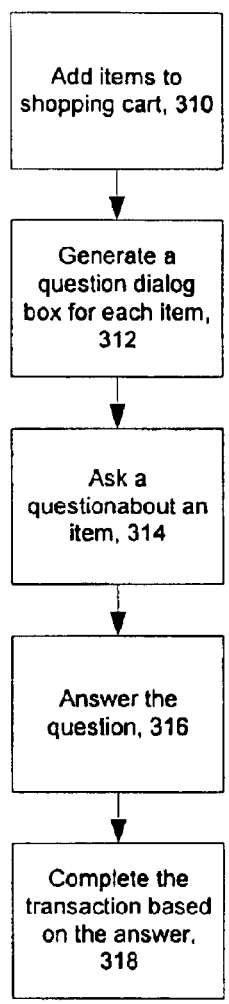
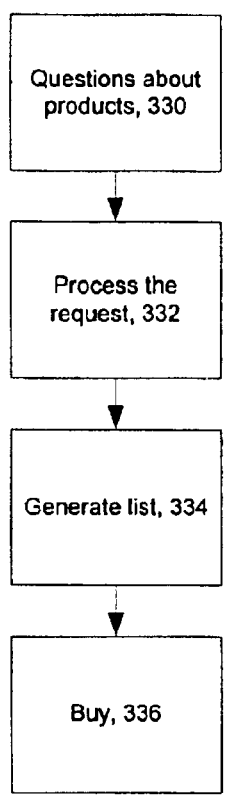
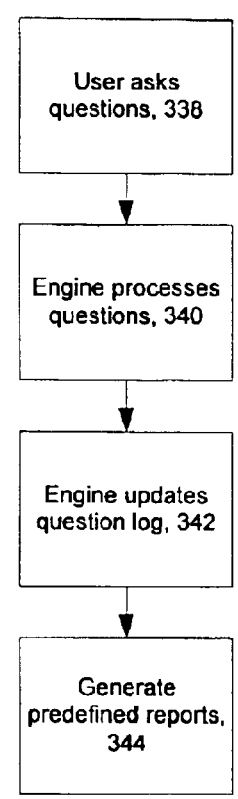
Figure 11    Figure 12
Figure 10

METHOD OF UTILIZING IMPLICIT REFERENCES TO ANSWER A QUERY

CROSS-REFERENCES TO RELATED APPLICATIONS

This application is related to commonly assigned patent application Ser. Nos. 09/573,025 now abandoned; 09/572,276 now abandoned; 09/572,186 now abandoned; 09/573,023 now abandoned; 09/573,024 now abandoned; 09/637,616 now abandoned; and PCT/US01/15711.

BACKGROUND OF THE INVENTION

1. Field of the Invention

This invention relates to answering natural language queries.

2. Description of Related Prior Art

Natural language query systems are known in the art. However, these systems do not utilize implicit references to answer a query and therefore are dependent upon literal constructs. Thus, it would be desirable to provide an improved natural language query system that utilizes implicit references to answer a query.

BRIEF SUMMARY OF THE INVENTION

The invention includes a method of receiving segments of text, wherein individual segments have elements. Implicit references are inferred between elements of the segments. Inferring includes identifying implicit references to antecedent elements and identifying generalizations of elements contained in the segments. The implicit references are stored in a searchable index with a first column listing the elements and a second column listing corresponding generalizations of the elements. A query is received. In response to the query, one or more segments is identified as being relevant to the query based at least in part on the implicit references.

BRIEF DESCRIPTION OF THE DRAWINGS

FIG. 4 illustrates a voice-based process performed in accordance with an embodiment of the invention.

FIG. 5 illustrates a wireless communication process performed in accordance with an embodiment of the invention.

FIG. 6 illustrates an advertising process performed in accordance with an embodiment of the invention.

FIG. 10 illustrates an online shopping process performed in accordance with an embodiment of the invention.

FIG. 11 illustrates a product catalogue navigation process performed in accordance with an embodiment of the invention.

FIG. 12 illustrates a report generation process performed in accordance with an embodiment of the invention.

DETAILED DESCRIPTION OF THE INVENTION

Figure 1:
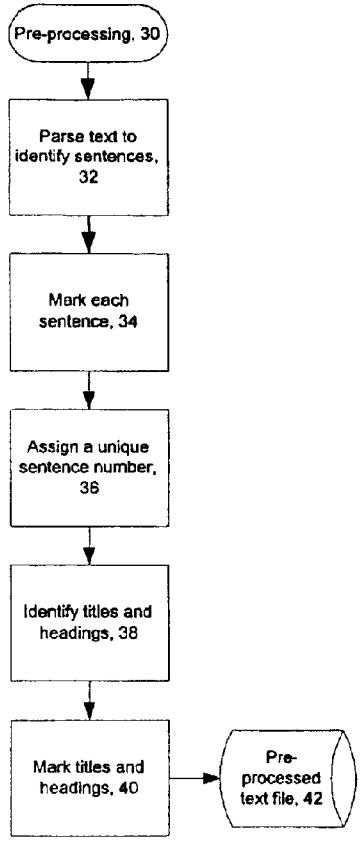
FIG. 1 illustrates a preprocessing routine performed in accordance with an embodiment of the invention.

A query may be a question phrased in English, for example, and the response may be sentences of text that belong to a body of free-text sources and are responsive to the question.

One way to find the relevant sentences of text uses an index that is created in advance. In a simple example, an index could include the words "Georgia" and "capital" and associated pointers to sentences that include those words. At run time, if a question asks about the capital of Georgia, the index can be used to find responsive sentences.

In the invention, implicit references (also known as anaphora in linguistic literature) are inferred from the words of segments of text. In response to a query, one or more segments are identified as relevant to the query based at least in part on the implicit references. Using implicit references improves the quality of the responses to the query.

A characteristic of natural language text is the use of words (references) that refer to other words or to concepts that appear in or are implied by other parts of the text (antecedents). For example, in the sentence "He is best known for his theory of relativity," the word "he" (the reference) may refer to the name "Albert Einstein" (the antecedent) that appears in another sentence: "Albert Einstein was one of the greatest scientists of all time."

Two broad categorizations of references may be useful. One broad categorization is based on the positions of the antecedent and the reference. The other broad categorization is based on the type of reference. The first categorization is based on three distinct contexts in which the reference may be used in a question answering setting.

References of the kind that are based on position may occur in at least three different contexts in a question answering setting:

1. Between two sentences

S 1: Albert Einstein was one of the greatest scientists of all time.

S2: He is best known for his theory of relativity.

In sentence S2, the word "he" refers to "Albert Einstein" in sentence S1.

2. Between two questions

Q1: When was Einstein born?

Q2: Did he invent relativity?

In the question Q2, the word "he" refers to "Einstein" as used in question Q1.

3. Between a question and a sentence

S3: Einstein is best known for his theory of relativity.

Q3: Who invented relativity?

The word "who" in question Q3 refers to "Einstein" as used in sentence S3.

All three types of references may have to be resolved to match a question with responsive sentences in the free-text sources. Consider the following example:

S4: China is a huge country in eastern Asia

S5: It produces more cotton, rice and wheat than any other country.

Q4: What is the scientific classification of rice?

Q5: Which countries produce this crop?

The phrase "this crop" in Q5 refers to "rice" in Q4. The word "it" in S5 refers to "China" in S4. The phrase "which countries" in Q5 refers to "it" in S5 and in turn to "China" in S4. A resolution of the three types of references would show that S5 is a potential answer to Q5.

The second categorization is based on the type of phrase used for the reference and includes the following five groups (examples included):

Pronoun: China is a big country. It is in Asia.

Definite Noun Phrase: China is in Asia. This country produces rice.

Name variant: International Business Machines versus IBM, Great Britain versus Britain versus England.

Indirect references: (in an article about China): The climate is usually mild; (Here the climate does not refer to China but it is known that it is the Chinese climate that is under discussion. Indirect references rely on "has-a" relationships.)

Null references: "Cisco acquired Cerent Corp. for 7.5 billion dollars. The negotiations lasted 3.5 months." The second sentence is responsive to the question "How long did Cisco negotiate with Cerent? even though it does not contain any words that refer to Cisco or Cerent.

Implementations of the invention take advantage of references to identify sentences in free-text sources that may answer natural language questions.

One goal of some implementations of the invention is to shorten the processing delay in receiving an answer after a question is posed at run time. In general, shifting processing steps from run time to a preliminary indexing phase can reduce the delay.

One way to shift processing to the indexing phase relates to the need to match synonyms that appear in a question and in a sentence. For example, the words "produces" and "raise" in the following question and sentence must be matched at run time:

S6: China produces more corn than any other country.

Q6: In which countries do people raise corn?

By generating and storing synonyms for the word "produces" during the indexing phase, rather than generating synonyms for "raise" at run time, the processing delay in responding to questions can be reduced, an advantage which justifies the additional storage space required for the larger index.

Another opportunity for shifting processing to the indexing phase relates to the fact that there tend to be many more specializations of a concept than generalizations of a concept. For example, there are more than 250 countries (including China) that represent specializations of the concept "country" but relatively few generalizations for the concept "China". So, in the following example, overall processing time is saved by generating and storing the generalizations of "China", the concept that appears in the sentence, during the indexing phase, rather than generating the larger number of specializations of "countries", the concept that appears in the question:

S7: China produces more corn than any other country.

S8. In which countries do people raise corn?

Thus, in general, in one aspect, the invention features receiving segments of text (e.g., sentences), each segment having elements. Implicit references are inferred from the elements of the segments. A query is received, and, in response to the query, one or more segments are identified as relevant to the query (e.g., by scoring) based at least in part on the implicit references.

Implementations of the invention may include one or more of the following features. The implicit references may be inferred prior to the time when the query is received and may be stored as entries in a searchable index, each entry including a pointer to one of the segments from which the reference was inferred. One or more of the identified segments may be selected for presentation to a user.

The implicit references may be generalizations of the elements contained in the segments. The references may be name variations that refer to elements, or indirect references to elements, or definite noun phrase references to elements, or pronouns, or null references. The antecedents of the indirect references may be found in titles or in headings. The antecedent can be a concept recognized by a pattern of characters (e.g., a date) and it can be referred to by a generalization (e.g., "when" or "at that time").

The scoring may be based on a matching of elements in a question with elements in an index file that contains information about the inferred implicit references. The selection of segments to be displayed may be based on scoring. As few as one segment from a given source need be displayed. The step of responding to the query may include identifying implicit references between the query and a previous query.

Some implementations of the invention are illustrated in the block diagrams of FIGS. 1 through 12 and described below.

In some implementations of the invention, free-text sources are prepared for use in answering questions by first applying a preprocessing routine 30, shown in FIG. 1. First, the text is parsed (32) to identify sentence boundaries. For purposes of parsing, the sentence boundaries are identified using patterns that are manually created, although other approaches could be used. In the manual approach, patterns are described that identify potential end-of-sentence markers (period, question mark, exclamation point, paragraph break, title break, sometimes quotes, etc.). Then certain alternative uses are eliminated. For example, in the case of a period, the eliminated alternative includes periods that appear at the end of abbreviations and in acronyms and floating point numbers, for example.

Each sentence is marked (34) with a single new line in one implementation, or using markup tags in another implementation. A unique sentence number is assigned (36) to each sentence. The numbers are unique within a single index file. Therefore all sentences (whether or not from different documents) that go into a single index get unique numbers. In another implementation, part of the unique numbers (e.g., the first six digits) are used to encode the article the sentence is coming from and another part (the last four digits) is used to identify the sentence number within the article.

Titles and other headings are identified (38) in a manner that depends on the text format. Some formats (like HTML) use markup elements that identify the titles. Plain text sources require pattern-based analysis. Titles also are marked (40) to identify some possible indirect references. An example would be the sentence "The economy is booming." found in an article entitled "China". Notice that unlike in the case of the sentence "This country produces rice", none of the words in the sentence "The economy is booming" directly refers to China. However, from the title one can infer that the subject is the Chinese economy. One way to index the title information is with respect to every sentence in its scope. Another more complicated way to use the title information is to build and make use of a knowledge base of part-whole, group-member relationships. Such relationships would include, for example, the fact that a typical country has a population, an economy, a president, and an army, etc. Then, when any of these words (e.g., economy and president) are used by itself in a sentence, the indirect reference to the country can be identified. The output of the pre-processing is a pre-processed text file 42. In one implementation, the pre-processed text file has text of one sentence on each line preceded by a sentence number and a tab character and followed by the text of the applicable titles. In another implementation, a special markup language (similar to HTML or XML) may use specific tags to mark sentences, paragraphs, sections, documents and titles in the text. The sentence tags contain id numbers as part of the tag such as: <s id=124345>. This format is more flexible and may be easily extend to include other tags. A user may be permitted to specify references not identified by the indexer by explicitly inserting them into the pre-processed text file using specific tags.

Figure 2:
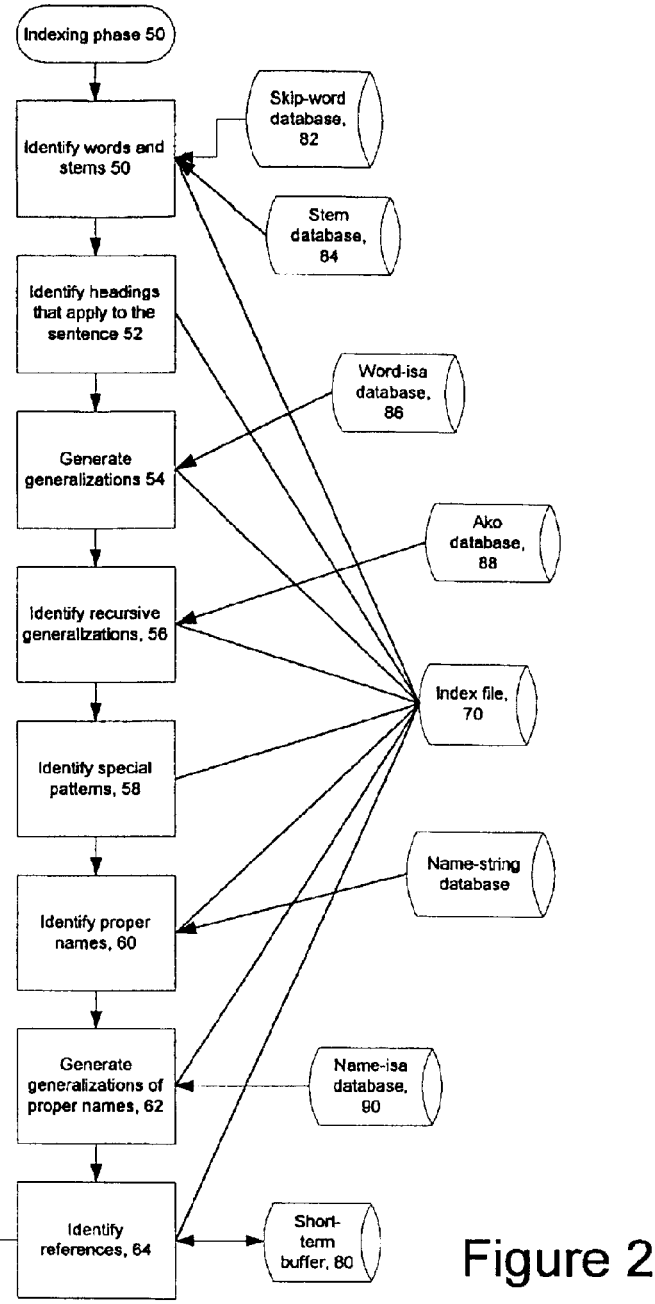
FIG. 2 illustrates indexing operations performed in accordance with an embodiment of the invention.

In one implementation, all the text sources that go into a single application (e.g., a whole encyclopedia) can be converted into one large pre-processed text file before being passed to the indexer. Another implementation could use separate pre-processed files for each article and let the indexer read the information from multiple files. As shown in FIG. 2, after pre-processing, the indexing phase 50 begins. The purpose of the indexing phase is to use the preprocessed text file 42 to build an index file (table) 70 that lists foreseen ways in which a question may refer to an element of a sentence. A single index file is built for all sources in the system.

By "element" of a sentence, we mean a concept referred to in the sentence. The concept may be referred to using an ordinary word (walk, cake), a name (Bill Clinton), a multi-word phrase (stand up, put on), a pronoun (he referring to Bill Clinton), a definite noun phrase (the country referring to China), an indirect reference (the economy, indirectly referring to China), or a null reference (there is no word referring to the concept but the concept is still referenced). For example, if the text contained the sentences: "The war started in 1939. Germans invaded Poland.", the answer to the question "When did Germans invade Poland?" would be 1939 even though there is no word in the second sentence directly or indirectly referring to this time phrase. Time phrases and place phrases often affect more than a single sentence, therefore creating null-references.)

Each entry in the index file 70 includes a pointer to the sentence to which the questions may refer based on that entry. Conceptually the index file relates the elements found in a sentence to a unique identifier for that sentence. The index file can be thought of as a two-column table in which one column contains sentence ID numbers and the other column contains the words, concepts, referents, generalizations, and synonyms (collectively referred to as the elements of the sentence).

For efficient scoring later, the following three components are created for the index: the string buffer, the sentence id buffer, and the hash table.

The string buffer contains the null terminated strings of each element found in the source text. The strings are placed in the buffer consecutively in no particular order.

The sentence id buffer contains sentence ID arrays for each element The array for a particular element can be identified by giving the start position in the buffer and length of the array. The arrays are placed in the buffer consecutively in no particular order.

The hash table is a standard hash table that contains key-value pairs and that enables a fast search of a given key. The key of each entry is a pointer to the string buffer. The value of each entry consists of a pointer to the sentence ID buffer and an array length.

This structure enables finding the sentences that contain a particular element as follows: First, the element is searched in the hash table by comparing it with certain keys in the hash table. For each comparison, the string in the string buffer that the key points to is retrieved and compared to the element. When a match is found, the corresponding sentence ID buffer pointer and array length is read. Finally, the specified array is located in the sentence ID buffer.

In the indexing phase, each sentence in the preprocessed text file 42 is read and passed to several modules. Each module reads the words of a sentence and, based on them, recognizes certain types of constructions and references that represent foreseen ways in which a question may refer to an element of the sentence. When a module identifies one of those ways, it writes an entry into the index file 70 together with the unique identifying number of the sentence from which it was generated.

In one implementation, there are eight indexing modules called: words, title, word-isa, ako, patterns, names, name-isa, and references.

As shown in FIG. 2, the words module identifies (50) each word in the current sentence and adds it to the index file. The words module also derives the stem of each word using a table of English word and word stem pairs, such as . flowers->flower and went->go. The words module adds the stem to the index file for use, for example, in matching morphological variants of words that may appear in a question.

In the title module, the words in each heading in the set of headings that apply to a sentence are added (52) to the index file with pointers to the sentence. In one implementation only one heading (the document title) is used for every sentence in a document. In another implementation, the pre-processed text file contains tags for titles of various levels (document, chapter, section, subsection, for example) and sectioning tags that identify the scope of each title. Using these tags, the indexer is able to determine, for each sentence, the document, the chapter, and the section that it is in. The indexer combines all titles that apply and indexes them with the sentence. Title indexing may not be appropriate for every source. For example, encyclopedia sources have well defined titles that are usually appropriate and helpful whereas newspapers have partial sentences for titles, which are usually not appropriate for the above method.

The word-is a module generates (54) the generalizations (mentioned earlier) for words that appear in the sentence and for words that appear in headings. For example, if the word "red" appears in a sentence, the generalization word "color" is placed in the index file so that a question that asks "what color" will be matched to the sentence that includes "red". For this purpose, a database table with the same name (word-isa) and containing two columns is used. The first column contains words and the second column contains possible generalizations. For example, "red->color" would be one of the entries in that table.

The ako module identifies generalizations (56) of generalizations already generated. For example, if the ako module encounters the generalization "color" that had been generated at step 54, the ako module adds the further generalization "attribute" to the index file.

The patterns module reviews (58) the text for special patterns of dates and numbers and adds the generalizations to the index file. For example, if the date Jan. $23^{rd}$, 1998, appears in the text, the patterns module would add the generalizations "date" "time" and "when" so that when a question asks "when did this event happen?" it matches the date. Another example that appears frequently in an encyclopedia is the lifespan information in biographies. The first sentence of a typical biography starts "John Doe (1932□1987) . . . ". A pattern that recognizes the life-span structure allows matching of questions of the type "When was John Doe born?"

The names module identifies proper names (60) in the text and generates and indexes the names accordingly. For example, the names module uses two methods to identify names in a sentence. The first method uses a list of precompiled names and name variations to match those in the sentence. For example "United States" and its variations "U.S.A." and "United States of America" would be in the name list and each would be recognized as a name when seen in the sentence. The second method uses patterns that identify names and name types. Proper names are marked with capitalization and can be isolated easily. (There are some difficulties associated with sentence beginnings and small function words like "of" that are not capitalized in the middle of a name.)

The names-isa module generates generalizations (62) for proper names and adds them to the index file. For example, if the name "Clinton" is found in the text, the word "President" could be added to the index file. Other examples are "China->country" and "Albert Einstein->physicist". The name generalization makes use of a knowledge based and a pattern based method as well. If a name is found in the database, generalizations of the name are located in the name-isa table. This is a table just like the word-isa table that lists one or more generalizations for a given name. For names that were not found in the table but that were detected using capitalization, for example, the rough generalization of the name (person, place, organization) can be inferred using internal and external clues. An example of an internal clue would be the appearance of the word "Corp." as part of the name, which would imply that it is a company. Similarly "Mount" or "City" implies a place and "Mr." or "John" implies a person. External clues are words outside the name that provide information. For example, if a name is preceded by "in" one can deduce that it is a place or possibly an organization but not a person.

The references module identifies (64) implicit references in the form of pronouns, definite noun phrases and name variants. The module could also handle indirect references and null references. (Handling indirect references would require a "has-a" table similar to the "is-a" table discussed below. The "has-a" table would represent relationships of the kind: "A country has an economy, a president, an army, etc."

Antecedents of references are determined using a short-term buffer 80. The antecedents are added to the index file, and the short term buffer 80 is updated with the potential references for the new names in the sentence, in the following way:

The short-term buffer contains a set of pairs of the type "he->Bill Clinton", "country->China", i.e. a potential reference pointing to a potential antecedent. The sentence is scanned for potential reference words or phrases. For each one discovered, the set of the potential antecedents is added to the index file. After each sentence is processed, the short-term buffer is cleared and updated with new potential references. The new potential antecedents are the names and other concepts used in the current sentence (either explicitly mentioned or implicitly referred to). The new potential references are all generalizations, name variants and pronouns compatible with these antecedents.

The short-term buffer 80 has two fields. One field contains antecedent words, the other contains potential references associated with each of the antecedents. As each element of a sentence is encountered, potential references are stored in the short-term buffer (e.g., when "China" is encountered in a sentence, the potential references "country", "nation", and "it" are added to the potential references field). When a referring word or phrase such as a pronoun or a definite noun phrase (e.g., "the country") is encountered in a later portion of the text, the word is looked up in the short-term buffer to identify the possible antecedents.

The modules that are active during the indexing phase use the following lexical databases to perform their functions.

A skip-word database 82 lists function words such as prepositions, conjunctions, and auxiliary words that are not to be added to the index file. The skip-word database is used in step 50 of FIG. 2.

A stem database 84, also used in step 50, contains a list of the stems of most English words. The word stems can be found in sources such as the CELEX lexical database available from the Linguistic Data Consortium of the University of Pennsylvania. Other sources for this material include on-line dictionaries. Alternatively, one could use a rules-based approach by analyzing a word and stripping its suffixes.

A word-isa database 86, used in step 54, contains generalizations of single words that can potentially match question words. The word-isa table is generated using three approaches: 1. Consulting online lexical ("word-related") databases like wordnet or thesauri like Roget's. 2. Writing data-mining programs that process large corpora (text sources) or the actual source to be indexed as a way to discover such relations. 3. Manually editing and cleaning up the results of 1 and 2. A source like an encyclopedia typically includes an article classification and a title index which contain useful information related to the generation of the is a and ako tables.

An ako database 88 contains lists of generalizations for single words and is used in step 56. The ako database is generated in a manner similar to the generation of the word is a table.

A name-isa database 90 contains generalizations for recognized proper names like countries, companies, and famous people and is used in step 62. The name-isa database is generated in a manner similar to the generation of the word is a table. The pattern-based rules mentioned before (which assign person/place/organization type general classes to names) can be used to expedite the process.

After the indexing phase, scores are generated (92) for each unique sentence element contained in the index file. The score is inversely proportional to the number of times the sentence element appears in the index file. The score also reflects the part of speech and the confidence in reference resolution. The score is stored in a score file 94.

In one implementation of the scoring algorithm, the score file contains a set of pairs of the type, for example, "walk->7.8611, "Clinton->15.76". The numbers are computed based on the frequency of the given term, e.g., as-log_2 (frequency). The frequency is either computed based on the index file by counting the number of occurrences of each term in the index file or based on a large reference corpus (such as the Cob corpus frequencies from CELEX). The latter is particularly useful when the data to be indexed is small and its frequencies are not statistically significant. The score file may then be manually modified to assign higher values to domain-specific terms or lower values to optional modifiers.

The index file is in the form of a set of pairs of the type "walk->132459", "Clinton->345512" etc. The numbers are unique sentence ID numbers. Here is an example sentence and some sample terms that are inserted into the index file for this sentence:

Sentence: He was the one of the brothers of the apostle Peter.
  Example terms:
Plain word: apostle
Stem: brother (from brothers)
Generalization: person (from apostle via word-is a file)
Indirect reference: Andrew ("he" refers to Saint Andrew in the previous sentence).

Once the indexing phase is completed, the index file and score file can be used as the basis for answering questions.

Figure 3:
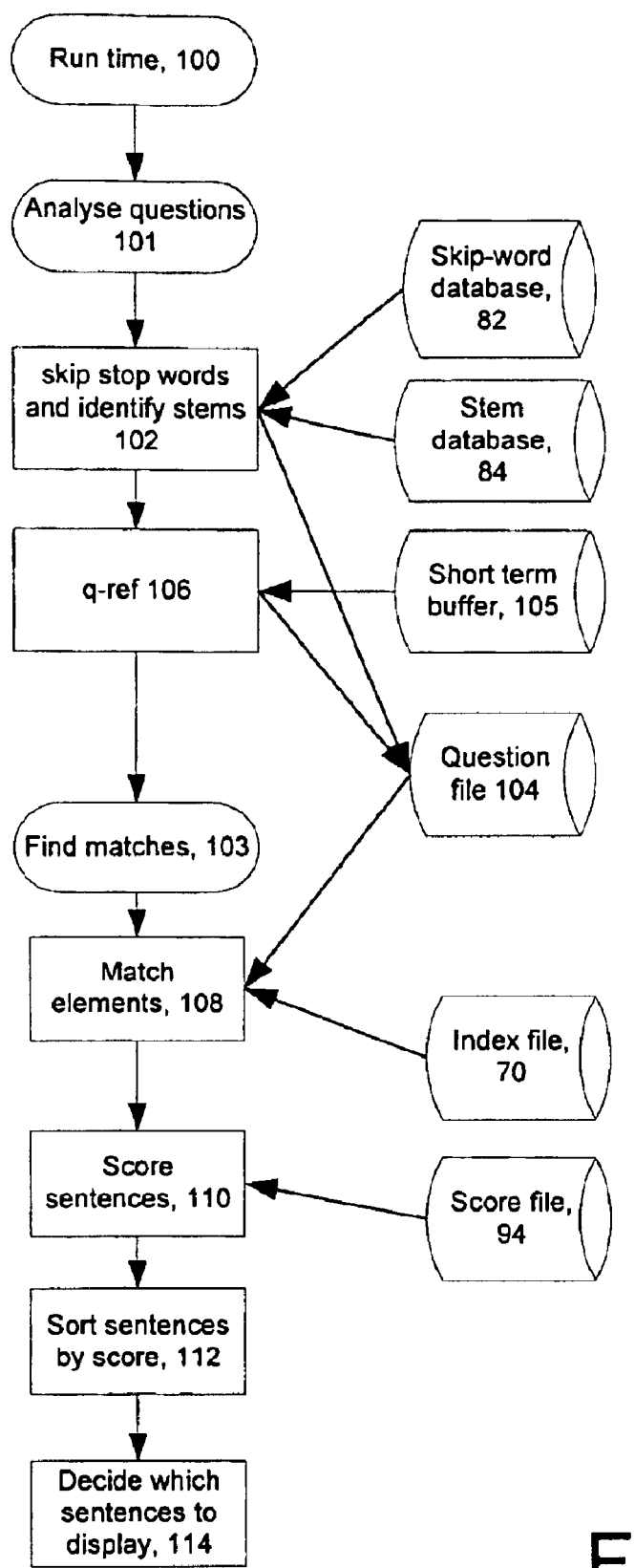
FIG. 3 illustrates a run time process performed in accordance with an embodiment of the invention.

As shown in FIG. 3, the run time process (100) receives questions posed by a user and uses the index file and the score file to identify sentences that may answer the questions. The run time process has two main parts. One part is the analysis of the questions 101 to produce a question file 104. The second part is the matching of information 103 in the question file with information in the index file to identify sentences that are likely to provide answers to the questions.

In the first part of the run time process, each word in a question is processed using modules similar to those used in the indexing phase.

A stems module 102 uses the skip-word database 82 to pass over certain words and uses the stem database 84 to determine stems of each word and records them in the question file 104.

A q-ref module identifies (106) potential references between the current question and antecedent elements of other questions. The identification is done in a manner similar to step 64 in FIG. 2, using a short-term buffer 105. The antecedents are recorded in the question file 104.

No generalizations, synonym generation, etc. are performed at run time. It is important that such steps not be performed at run time to avoid double matching.

The matching part of the run time process searches in the index file for each element in the question file 108. If an element in the question file is found in the index file, an answer score for the sentences associated with that element is updated by adding the score 108 associated with that element in the score file 94.

After all elements in the question have been matched, the sentences are sorted 112 according to their respective total scores.

Using the sorted sentence list, a decision 114 is made about which sentences to display as the answer to the question.

One approach is to display sentences that are at the top of the scoring. By comparing the sentences having the highest scores with the maximum possible sentence score, a determination can be about the quality of the answer represented by each of those sentences. A typical noun in English is worth about 10 to 15 points. A sentence that has a score within 10 points of the maximum possible score would represent a high quality answer. If the answer quality of the highest scoring sentence is high, that sentence could be displayed alone. If several of the top-scoring sentences have close scores, they can all be displayed. A bias can be applied to cause the display of high-scoring sentences from different free-text sources in lieu of multiple sentences from a single source.

If the highest scoring sentence is not a high quality answer, or if the question is a "how" or "why" question, additional context around the sentence can be displayed to aid the user's interpretation. For this purpose, the display algorithm can be configured to display one or two neighbor sentences around the sentence or the whole paragraph around the sentence.

If the highest scoring sentence is a low quality answer, the user could be told that no good answer was found and a few pointers to relevant documents could be displayed.

The answer system is useful in a wide variety of contexts, including the Internet, local networks, or a single workstation. In the case of the Internet, the indexing can be done at a central location and the run time process can handle questions received from browsers at a central server.

The invention offers a number of advantages. In particular, the quality of the answers is high because the indexing of implicit references significantly improves the chances that useful responsive sentences will be found. The invention is useful in a wide variety of contexts, among them on-line searching using the World Wide Web.

Other implementations are within the scope of the claims.

For example, portions of text other than sentences, such as paragraphs or sections or chapters can form the basis of the indexing and scoring. Also, other kinds of references and generalizations could be used as the basis for the indexing phase.

Questions need not be phrased as complete English sentences.

Languages other than English can be used.

Indexing need not be captured in a single central index file and score file but can be distributed among multiple index files and score files. At run time, questions may be answered by a scoring system that operates on all of the files.

Other types of references (null, indirect) can easily be integrated into the existing framework once the necessary knowledge is built. Also, once grammatical relations are determined with satisfactory accuracy, they can be incorporated into the existing indexing retrieval framework without major changes to the architecture.

A variety of other applications may make use of the query response techniques discussed above. Among the applications are the following:

1. As shown in FIG. 4, a person could use any voice-based communication device, such as a wireless or wired phone, to connect (200) to a web site, and using voice, navigate the web site and obtain information by issuing voice commands and questions. The user could utter a natural language query (202). The website would include speech recognition software that would permit voice-to-text transcription of the query (204). The text would then be passed to the query response engine described earlier (206). The query response engine generates one or more responses (208) in text form and passes them to a speech synthesizer (210). The speech synthesizer converts the text to speech (212) that is played back over the phone to the user (214).

2. As shown in FIG. 5, a person could get answers to questions from a wireless communication device. After the device is connected to a web site 220, the user types a query on the device, either using a keyboard or a stylus only a touch-sensitive screen. At the website, the query is passed to the query response engine described earlier (224). The query response engine generates responses (226) that are in the form of answers to the query rather than in the form of links to places where the answer may be available. The answers are then returned to the wireless device (228). For example, the question entered by the user might be "What was one of Einstein's achievements?" One response might be the answer "Einstein developed the theory of relativity."

3. As shown in FIG. 6, advertising delivered to a web user can be personalized based on questions that the user asks. The user enters a query (230). As before, the text of the query is passed to the engine (232) and a response is generated (234). The engine also uses the response to generate ad TAGS (238). For example, if the question is "what are the ski conditions like in Aspen?" the engine will generate TAGS that relate to commerce for Aspen, such as "Ski Rental, Cabin Rental, Dining in Aspen, Flying to Aspen". These TAGS are then used to extract appropriate ads from ad inventory. The ads are presented to the user along with the answer to the question asked.

Figure 7:
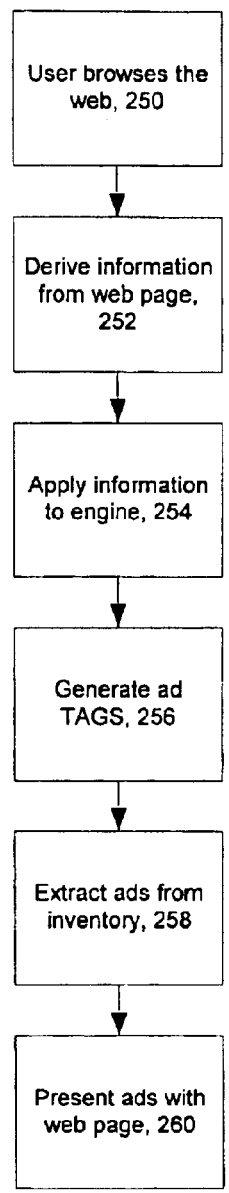
FIG. 7 illustrates a web browsing process performed in accordance with an embodiment of the invention.

4. As shown in FIG. 7, a user browses the web (250). Based on a web page being displayed to the user in the course of the browsing, a set of information, for example, words that appear on the web page, is derived for use with the query response engine (252). The information is applied to the query response engine as if it were a query (254). The results of the query are used to generate ad TAGS (256) and the TAGS are used to extract appropriate ads from ad inventory (258) as before. The ads are presented to the user as part of the page being read, or a later page (260).

Figure 8:
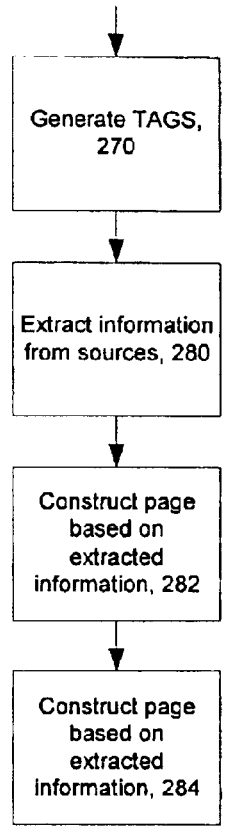
FIG. 8 illustrates a tag based process performed in accordance with an embodiment of the invention.

5. As shown in FIG. 8, in an application similar to the one described in FIG. 6, except that the TAGS are chosen 270 to relate to articles or information, for example, about Aspen, such as "latest Aspen news, Traveling in Aspen, Events in Aspen", etc. These TAGS are then used to extract appropriate information from information sources (280) and construct the next page that is shown to the user (282). The resulting personalized page is then presented to the user along with the answer to the question asked (284).

Figure 9:
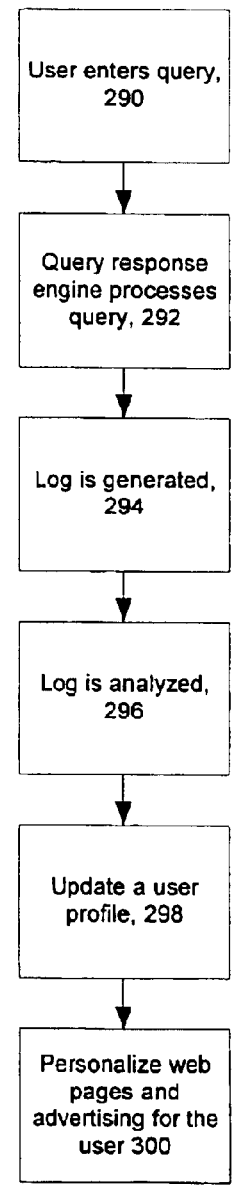
FIG. 9 illustrates a user profile preference process performed in accordance with an embodiment of the invention.

6. As shown in FIG. 9, another application develops user profile and preference information based on questions asked A user types (or asks) questions 290. The query response engine processes the questions (292) and generates a log (294) that includes the following information, for example: identity of the user (name, IP address, etc.); the questions asked and answers to the questions; any un-answered questions; and the click stream reflecting what the user did after the answers were delivered to him. The log is analyzed (296) to generate profile TAGs. The profile TAGS are used to update a user profile (298). The next time the user logs in, or enters another query, the updated profile is used to personalize web pages and advertising for the user (300).

7. As shown in FIG. 10, another application facilitates on line shopping by answering questions about products in the shopping cart. The user adds items to a shopping cart on a commercial web site (310). The items are used as the basis for generating question dialog boxes for each of the items (312). Each dialog box hovers above the shopping cart. The user may then ask a question about an item (314). The query response engine answers the question without forcing the user to leave the shopping cart (316). The answer is shown in the hovering dialog box. The user completes the transaction based on the answer (318).

As shown in FIG. 11, in another application, the user can navigate, e.g., a product catalogue by asking questions. The user (in plain language) asks the system to show products that meet specific criteria (e.g., "show me the cheapest PC", "the fastest car", etc.) (330). The query response engine processes the request (332) and generates a list or an item that meets the criteria (334). The user then clicks on the items to buy (336).

9. As shown in FIG. 12, in another application, corporate and departmental reports can be generated based on a question log. Users ask questions to interact with a reporting system (338). The query response engine processes the questions (340) and updates the question log (342). The log includes the following information: identification of the user (name, IP address, etc.); questions asked, and answers to the questions; un-answered questions; and the click stream indicating what the user did after the answer was given. The log is analyzed by a report generator to generate pre-defined reports (344). The reports use question subjects, frequencies, users, whether they were answered or not, and other information contained in the questions to surmise information that is relevant to various departments such as product development, support, finance, human resources, etc. The reports are interpreted by humans to make business decisions about new products, product design, financing, internal processes, control, and other aspects of the business. The reports are based on context and intelligence extracted from the questions the users ask.

What is claimed is:

1. A method, comprising:

parsing text from at least one source of free-text into segments that each comprise elements;

inferring implicit references between elements of said segments prior to any query, wherein inferring includes identifying one or more implicit references to at least one antecedent element to form one or more identified implicit references;

receiving a query;

in response to said query, identifying one or more segments as relevant to said query based at least in part on said one or more implicit references; and selecting said one or more segments for presentation.

2. The method of claim 1 wherein said parsing segments of text includes dividing said free-text source into said segments of text and corresponding generalizations.

3. The method of claim 1 in which said segments comprise sentences.

4. The method of claim 1 in which segments that are presented to said user are determined based on scoring.

5. The method of claim 1 in which only one segment is displayed.

6. The method of claim 1 in which only a single segment from a source is displayed.

7. The method of claim 1 wherein an implicit reference of said implicit references comprises a name variation that refers to an element.

8. The method of claim 1 wherein an implicit reference of said implicit references comprises an indirect reference to an element.

9. The method of claim 1 wherein an implicit reference of said implicit references comprises a pronoun.

10. The method of claim 1 wherein an implicit reference of said implicit references comprises a definite noun phrase.

11. The method of claim 1 wherein inferring implicit references further comprise deriving one or more generalized representations for said at least one antecedent element.

12. The method of claim 11 wherein deriving comprises:

generating said one or more generalized representations that refer to said at least one antecedent element; and identifying each of said one or more generalized representations that refers to said at least one antecedent element as a potential reference.

13. The method of claim 12 wherein said one or more generalized representations include one or more of:

a number of name variations, a number of single words, a number of multi-word phrases, a number of definite noun phrases, and a number of indirect references.

14. The method of claim 12 further comprising:

associating said potential reference with one of said segments from which said at least one antecedent element was parsed; and storing said one of said segments as a stored segment.

15. The method of claim 14 wherein storing comprises tagging said stored segment with said potential reference to form a tagged, stored segment, which is searchable by said potential reference.

16. The method of claim 12 wherein inferring implicit references further comprises:

generating alternative representations for an element other than said at least one antecedent element; and matching at least one of said alternative representations with said potential reference to form one of said one or more identified implicit references.

17. The method of claim 16 further comprising:

associating said one of said one or more identified implicit references with said at least one antecedent element; and supplementally storing another of said segments from which said element was parsed as a stored another segment.

18. The method of claim 17 wherein supplementally storing another of said segments comprises tagging said stored another segment with said at least one antecedent element to form a tagged, another stored segment, which is searchable by said at least one antecedent element.

19. The method of claim 18 wherein receiving said query further comprises:

parsing query text into query segments, each of which comprise query elements;

matching at least one query element with said at least one antecedent element that identifies said tagged, another stored segment; and retrieving said tagged, another stored segment.

20. The method of claim 19 wherein retrieving said tagged, another stored segment further comprises searching an indexed database using said at least one antecedent element.

21. The method of claim 19 further comprising determining the relevancy of tagged, another stored segment to said query text.

22. A method, comprising:

extracting a first segment of text and a second segment of text, both of which are from an electronic document of free-text;

decomposing each of said first segment and said second segment into a first set of elements and a second set of elements, respectively;

inferring a number of implicit references between an antecedent element of said first set and a reference element of said second set prior to any query;

storing said second segment in a database such that said second segment is indexed by said antecedent element;

receiving a query comprising at least one query element; and in response to said query, identifying at least one of said first segment or said second segment as relevant to said query based at least in part on one of said number of implicit references.

23. The method of claim 22 further comprising supplementally inferring a number of implicit query references based on potential query references derived from an antecedent query element of a preceding query.

24. The method of claim 23 wherein supplementally inferring said number of implicit query references further comprises deriving one or more generalized representations of said antecedent query element.

25. The method of claim 24 wherein deriving comprises:

generating said one or more generalized representations that refer to said antecedent query element; and identifying each of said one or more generalized representations that refers to said antecedent query element as a potential query reference.

26. The method of claim 25 wherein identifying further comprises storing said antecedent query element and said one or more generalized representations in a first column and a corresponding second column, respectively, wherein said first column and said second column constitute a short term buffer.

27. The method of claim 25 wherein supplementally inferring said number of implicit query references further comprises matching said query element with said potential query reference to form a matched query element, which is one of said number of implicit query references.

28. The method of claim 27 wherein identifying one or more segments as relevant further comprises retrieving said second segment using said one of said number of implicit query references to search a database.

* * * * *